United States Patent

Jones

[15] 3,693,142
[45] Sept. 19, 1972

[54] BOREHOLE ORIENTATION TOOL

[72] Inventor: Jack W. Jones, 503 N. Central Expressway, Richardson, Tex. 75080

[22] Filed: Nov. 21, 1969

[21] Appl. No.: 879,010

[52] U.S. Cl. ..................340/18 R, 33/205, 175/45, 340/18 P, 340/18 CM
[51] Int. Cl. .................................................G01v 1/40
[58] Field of Search.340/18 CM, 18 P, 18 R; 175/45; 33/20 S

[56] References Cited

UNITED STATES PATENTS

| | | |
|---|---|---|
| 2,317,632 | 4/1943 | Miller.....................33/205.5 E |
| 3,400,464 | 9/1968 | Karol..........................33/205 |
| 2,746,162 | 5/1956 | Picard .........................33/205 |
| 3,137,077 | 6/1964 | Rosenthal....................33/205 |
| 3,478,839 | 11/1969 | Zemanek, Jr................340/18 |
| 3,079,697 | 3/1963 | Lunde......................33/205 X |
| 2,992,492 | 7/1961 | Roussin .......................33/205 |
| 3,434,219 | 3/1969 | Bowman......................33/205 |

Primary Examiner—Richard A. Farley
Assistant Examiner—H. A. Birmiel
Attorney—George L. Church, Donald R. Johnson, Wilmer E. Corquodale, Jr. and John E. Holder

[57] ABSTRACT

The particular embodiment described herein as illustrative of one form of the invention utilizes a device for detecting the angular position and directional orientation of a housing within a wellbore and for generating a signal indicative of such information for transmission to the earth's surface.

8 Claims, 4 Drawing Figures

INVENTOR
JACK W. JONES

ATTORNEY

INVENTOR
JACK W. JONES

*John E. Holder*

ATTORNEY

BOREHOLE ORIENTATION TOOL

BACKGROUND OF THE INVENTION

This invention relates to a position sensing device and more particularly to an apparatus for sensing the position of an object and providing an electrical signal indicative of the attitude of such object. During the drilling of boreholes in the earth, it is often desirable to determine the attitude of the hole, not only at the bottom of the hole, but throughout its traverse of earth formations. It is for this reason that various apparatus and methods have been devised for making such determinations of borehole attitude. Normally such systems consist of apparatus for measuring the angular disposition of the hole with respect to some reference such as a horizontal reference plane, and in addition, means for determining the direction of the hole with respect to a reference such as Magnetic North. A typical apparatus for making such determinations of a borehole position consists of an instrument unit, including a compass or a gyro, together with an angular unit having a plumbob arrangement, and a photographic device of some sort for making a photographic recording of the instruments in the wellbore. In the past, these instruments have been run on wirelines or godeviled into the drill pipe where they are subsequently retrieved as in the latter case, by removing the drill pipe from the borehole. Upon retrieval of the instrument to the surface, the photographic equipment is removed and the exposed film record of the instrument recordings is then removed to a suitable location for developing the film. Thereafter, if calculations are to be made regarding the orientation of the borehole, such information derived from the film can then be utilized in computation equipment for making such determinations. In any event, the procedure outlined above is time consuming, and if decisions for continuing drilling or for making changes in the orientation of the well bore are required, then such decisions must be held in abeyance until the film is developed and computations can be made from the indicated parameters of the well borehole.

It is therefore an object of the prevent invention to provide a new and improved apparatus for determining the positional orientation of an object.

SUMMARY OF THE INVENTION

With this and other objects in view, the present invention contemplates an instrument for use in a borehole within the earth for detecting and sending signals to the surface indicative of the orientation of the apparatus within the borehole.

The device may be comprised of separate units for detecting different parameters of orientation. The units are comprised of a scanning device and means actuable in response to the scanning device for sending a first signal to the surface indicative of the reference position on the apparatus relative to the apparatus housing. A second signal is sent to the surface and is indicative of the position of a member within the apparatus housing in turn which is determinative of a positional parameter of the housing within the borehole. The scanning means is time pulsed so that it may be determined, by counting such pulses between the first and second signals, what the angular difference is between the first and second signals. This angular difference may be translated into terms of degree of direction or degrees of angular deviation.

A complete understanding of this invention may be had by reference to the following detailed description, when considered in conjunction with the accompanying drawings illustrating embodiments thereof.

DESCRIPTION OF THE PREFERRED EMBODIMENTS

The apparatus described herein is provided in a borehole tool for detecting positional parameters of an instrument within a borehole, and transmitting such data to the surface where it is processed and recorded in a form permitting a direct read-out of borehole orientation data. The apparatus forming this invention includes the downhole units for detecting such positional orientation and for providing a signal to the surface indicative of such information.

Figures 1, 4:
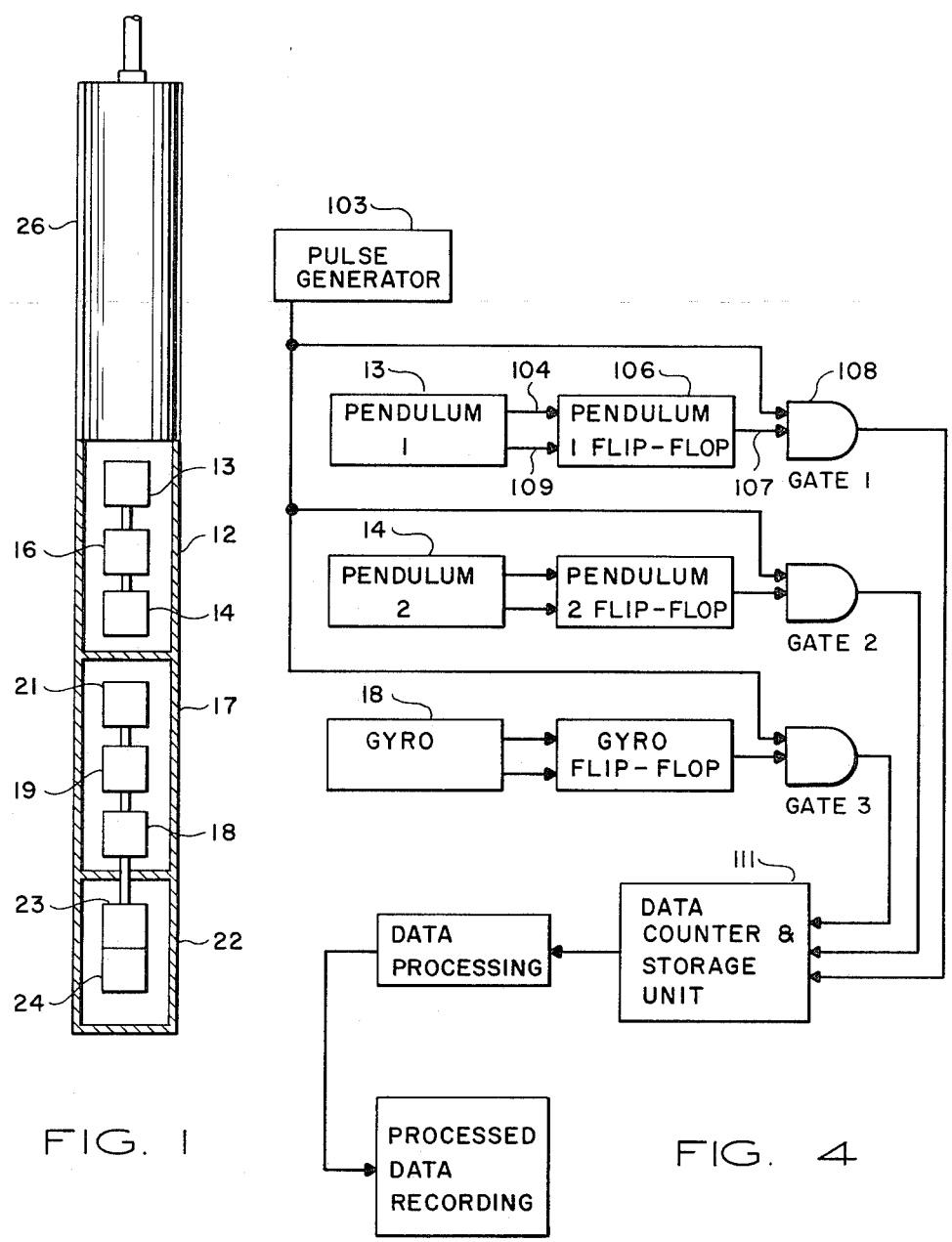
FIG. 1 is a schematic view of a wellbore tool including instruments for measuring angular and azimuthal parameters of the tool position.
FIG. 4 is a schematic drawing of a system for transmitting wellbore instrument data to the surface.

FIG. 1 shows a schematic of such a wellbore tool which includes an angle detecting section 12 having first and second angle detecting units 13 and 14 mounted therein to measure the angular disposition of planes in section 12 which are 90° to one another. A synchronous motor 16 is positioned between the units to provide a source of power for driving scanning systems within the units to thereby monitor parameters of the detecting units which are indicative of their angular disposition. The motor 16 has output shafts extending upwardly and downwardly therefrom to drive the respective scanning systems for the first and second units 13 and 14. A directional section 17 is positioned below the angle detecting section and includes mechanisms for measuring the directional orientation of the housing relative to the earth's surface. The directional section 17 incorporates a gyroscope 18, a gyro motor 19, and an encoder 21 for providing a reference signal to the detecting unit. A lower section 22 houses a gyro torque motor 23 and a torque motor circuit 24 for controlling precessing of the gyro. An upper electronic section 26, of the tool houses an electronic scanner circuit and data counter and storage units.

Figure 2:
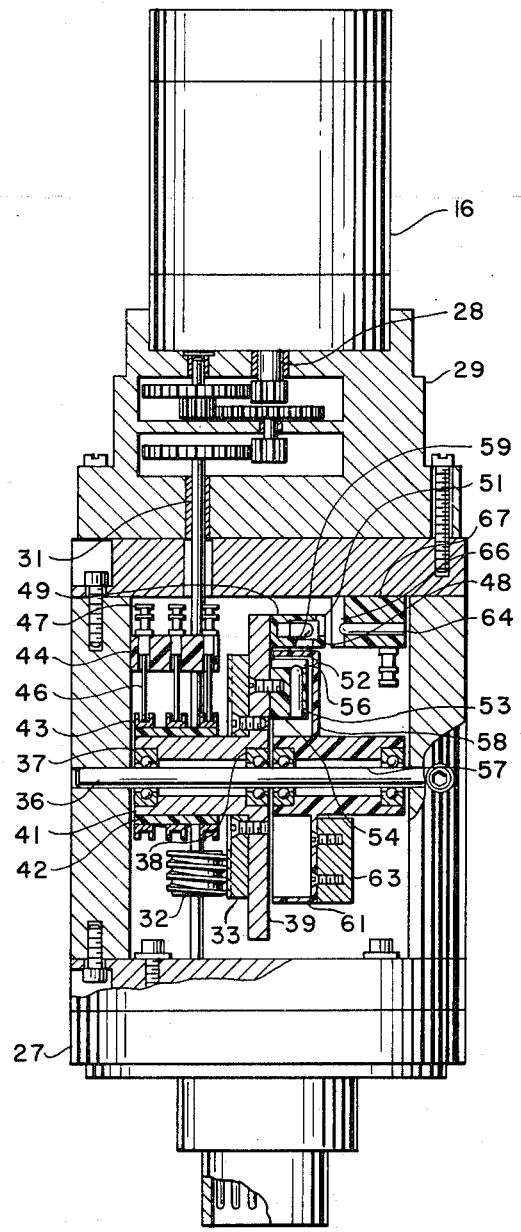
FIG. 2 is a partial cross sectional view of a wellbore instrument for measuring the angular orientation of the instrument within the wellbore.

An angle detecting unit 13, 14 for generating a signal indicative of the angular position of the instrument within the borehole is shown in detail in FIG. 2 of the Drawings. The angle unit includes a partially enclosed housing 27, having the synchronous motor 16 mounted at its upper end. The motor has an output shaft driven at 3,600 rpm. Between the synchronous motor and housing is mounted a transmission or gear reduction section 29 which has two stages of pinion gears connected with the output shaft 28 of the synchronous motor for reducing the output revolution thereof. The output of the gear reduction section is fed through a shaft 31 which extends longitudinally from the upper to the lower end of the instrument housing. At the lower end of the output shaft, a worm gear 32 is rotated therewith for driving a spiroid gear 33, which in turn drives a scanning system within the instrument. The total gear reduction between the output of the synchronous motor and the rotation of the spiroid gear within the instrument housing is from 3,600 rpm of the motor to 20 rpm of the spiroid gear 33.

The angle detector and scanning system are located within the housing and include a horizontal shaft 36 extending transversely across the housing midway between its ends. A scanner assembly is rotatably mounted about the left side of the shaft as viewed in FIG. 2, and is provided with bearings 37, 38 for rotatably supporting the assembly about the shaft. The scanner assembly is comprised of a large diameter vertical disc 39 upon one side of which is mounted the circular spiroid gear section 33. The spiroid gear is arranged to mesh with the worm gear 32 on the shaft 31 extending vertically through the housing. A sleeve 41 extends outwardly from the vertical disc 39, and is positioned about the horizontal shaft 36. An insulating cylinder 42 is positioned about the sleeve. Grooved commutator rings 43 are positioned about the insulator. The grooved commutators are electrically insulated from one another to provide separate electrical flow paths between the stationary portion of the instrument housing and the rotating scanner section. An insulating post 44 is positioned above the commutators and is connected to the side wall of the housing. Brushes 66 extend downwardly from the post into contact with the commutators. The upper ends of the brushes are connected to terminal posts 47 to provide a means for electrically connecting the brushes with conductor wires (not shown) within the instrument housing.

Referring again to the vertical disc 39 of the scanner section, a lamp 48 and lamp housing 49 are shown extending outwardly from the outer rim of disc 39 toward the center of the housing. A first longitudinal slit 51 is formed in the outer wall of the lamp housing and is perpendicular to the shaft 36. A second longitudinal slit 52 is formed along the bottom portion of the lamp housing 49 and is parallel with the shaft 36. A detector photocell 53 and housing 54 are mounted on the disc 39 and extend outwardly from the disc on the same side as the lamp 48 and housing 49. Wires (not shown) extend from the photocell through the disc and into contact with the commutator rings. The photocell housing has a slit or opening 56 in its upper side wall and parallel to the shaft 36 to permit light emanating from lamp 48 to project into the housing for activating the photocell. Conductor wires are also provided to the lamp housing from the commutator rings to provide an electrical power source to the lamp.

A pendulum assembly is also mounted on the horizontal shaft 36 opposite the scanner assembly. The pendulum assembly is comprised of an annular sleeve 57 positioned about the shaft and rotatably supported thereon by means of bearings at each end of the annular sleeve. A circular shield 58 extends outwardly from the sleeve and includes an L-shaped end portion 59 extending inwardly therefrom toward the circular disc 39 of the scanner section. The inwardly extending portion 59 of the shield approaches contact with the vertically mounted disc 36, but does not contact the disc, so that the pendulum assembly is free to move independently with respect to the scanner assembly. The shield and its inwardly extending portion are arranged to pass over and about the detector photocell 53 and housing 54. The inwardly extending portion of the shield passes between the bottom of the lamp housing 49 and the upper side of the photocell detector housing 54. A slit 61 is formed in the inwardly extending portion of the sleeve in parallel relationship with the slit 52 formed in the lower side of the lamp housing. A weighted pendulum member 63 is connected to the shield 58 and covers a partial segment of the shield. This weighted pendulum member maintains the shield in an oriented position relative to gravity, regardless of the position of the housing with respect to gravity, since the pendulum assembly is freely mounted for rotation upon the horizontal shaft 36. The slit 61 in the inwardly extending portion 59 of the shield is positioned at a point thereon corresponding to a point on the periphery of the weighted pendulum member 63 directly below the center of gravity of the weighted member when the member is at free rest relative to gravity.

Also mounted within the interior of the housing is a second or reference photocell or other such light sensitive device 64, which is positioned at the upper end of the interior portion of the instrument housing opposite a point on the path of movement of the lamp 48. A vertical slit 66 is provided within the outer wall of the photocell housing 67, which slit is arranged to be oppositely disposed and parallel to the vertical slit 51 in the lamp housing 49. Conductor wires (not shown) provide an electrical power source for the photocell 64.

In the operation of the apparatus just described, the synchronous motor 16 is continuously driving the gear reducing mechanism to rotate the spiroid gear 33 and scanner disc at a rate of 20 revolutions per minute or 1 revolution every 3 seconds. This means that the lamp 48 on the scanner disc 39 will pass in front of the reference photocell 64 on the interior wall of the housing, once every 3 seconds. The lamp 48 is continuously energized. As a result, the reference photocell will be activated to generate a signal once every 3 seconds for purposes to be hereinafter described.

As the scanner disc and lamp continue to rotate during each revolution, a second signal is generated when the lamp 48 passes the slit 61 in the inwardly extending portion of the pendulum shield. The slit 61 permits light from the lamp to impinge upon the detector photocell 53 which is positioned on the scanner disc 39 next to the lamp 48. The shield normally prevents the lamp from activating the photocell 53, except when the lamp and photocell pass the slit 61 in the pendulum once during each revolution of the disc. The slit in the shield is positioned relative to the gravitational pull of the weighted pendulum member, so that even though the housing is tilted at an angle with respect to the vertical, the shield will remain in a constant position determined by the force of gravity. Therefore, the slit 61 in the shield will always remain at the bottom (relative to earth's gravity) of the pendulous shield. As the lamp 48 and photo detector cell 53, which are mounted on the scanner disc move past the slit 61 in the pendulum shield at its lower side, the light emanating from the lamp will pass through the slit and be projected upon the detector photocell, which in turn generates a signal that is picked up from the commutator rings and brushes for purposes to be hereinafter described.

It is readily seen that as the scanning disc 39 rotates, a pulse is generated once every 3 seconds by the case reference photocell 64, and that a second pulse is generated at some time lapse after the first case reference photocell pulse is generated, depending upon the position of the slit 61 in the pendulum shield relative to the case reference photocell. If, for example, the instrument housing were lying in a horizontal position with respect to the surface of the earth, the scanner, if operating in a clockwise direction, (as viewed from the right side as shown in FIG. 2) would generate a first signal when the lamp 48 passes the slit 66 in the case reference photocell housing. Ninety rotational degrees thereafter, the scanner would generate a second signal when the lamp 48 passes the slit 61 in the pendulum shield to activate photocell 53. If the time rate of rotation of the scanning disc 39 is known, then the actual number of degrees transgressed by the scanning mechanism between such first and second signals may be calculated.

In order to provide completely accurate information as to the angular position of the instrument housing with respect to a vertical reference plane, it is desirable to utilize a second angle detecting unit 14, which is mounted so that the scanning disc and pendulum shield of the second instrument are in a vertical plane perpendicular to that of the plane of the shield and disc in the first instance. As will be described hereinafter, the data outputs of each of the pendulum instrument sections is fed to a data processing unit where a vector summation of the outputs provides a true calculation of the angular disposition of the instrument housing.

Figure 3:
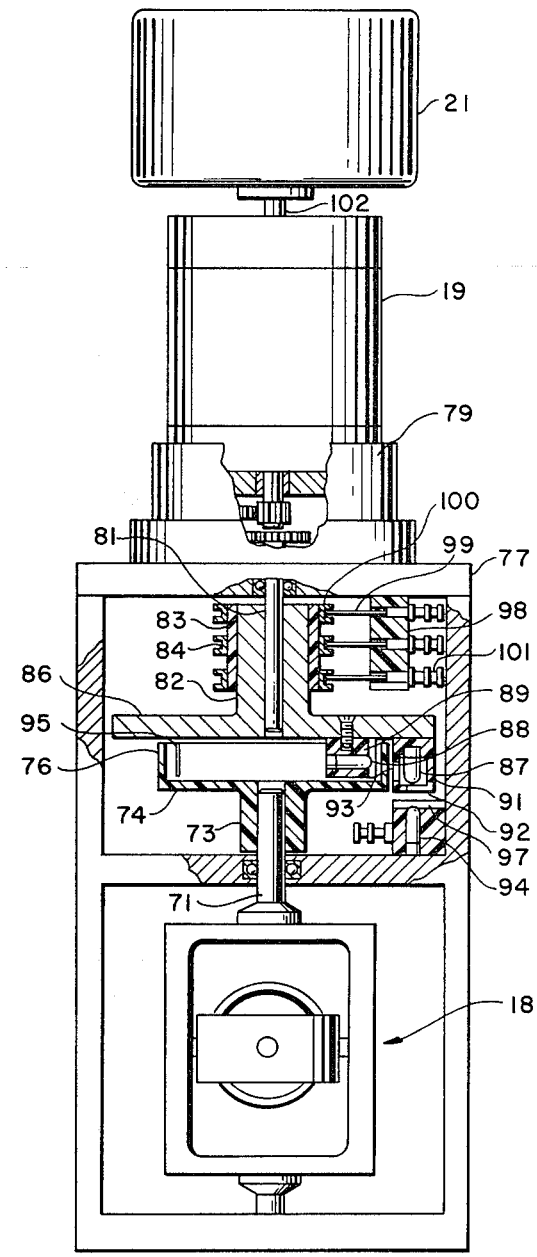
FIG. 3 is a partial cross sectional view of a wellbore instrument for measuring the directional orientation of the instrument within the wellbore.

Referring now to FIG. 3 of the drawings, details of the directional unit 17 (FIG. 1) are shown. Directional unit 17 provides information relative to the directional or azimuthal orientation of the instrument housing. The unit shown in FIG. 3 is very similar to that of FIG. 2 in that a scanning section is rotated relative to a shield, which instead of being oriented by a pendulum, is driven by the rotation of the vertical shaft 71 of the directional gyroscope 18. The vertical or output shaft 71 of the gyroscope is shown connected to a vertical sleeve 73, which is press-fitted onto the output shaft of the gyro. The sleeve has an outwardly extending shield portion 74 which in turn has an upwardly extending circular shield wall 76. The gyro instrument housing 77 has synchronous motor 19 and gear reduction section 79 mounted on its upper side, with the output shaft 81 of the gear section extending through the top of the instrument housing 77 and downwardly into the instrument. Bearings are provided in the top of the instrument housing to rotatably support the motor driven output shaft. A scanning section is mounted on the motor driven output shaft for rotation within the instrument housing. The scanner section is comprised of a vertical sleeve 82 attached to the lower end of the shaft. The sleeve has an insulated cylinder 83 about its outer walls upon which are mounted commutator rings 84 which are electrically insulated from one another. At the lower end of the scanner sleeve, a horizontally disposed circular disc or plate 86 is shown extending outwardly therefrom. A scanning lamp 87 is attached to the lower side of the circular disc near its outer rim and extends downwardly therefrom. A detector photocell 88 is also attached to the under side of the disc and is mounted within a detector photocell housing 89. A housing 91 is also disposed about the lamp, and is provided with a first horizontal slit 92 on the bottom side of the housing, and a second vertical slit 93 on the inner wall of the lamp housing. The upwardly extending vertical wall 76 of the shield is positioned between the scanning lamp 87 and detector photocell 88 mounted on the scanning disc. A slit 95 is formed in the vertical wall of the shield. A case reference photocell 94 is mounted within a housing 96 upon the inner wall of the instrument housing in a spaced relation with the outer rim of the scanner disc and the lamp 87. Clearance is provided between the reference photocell housing 96 and the lamp housing 91. A slit 97 is provided in the top side of the case reference photocell housing to permit light emanating from the lamp housing to impinge upon the photocell 94.

An insulating block 98 is shown extending downwardly from the upper end of the instrument housing. The block holds horizontally disposed brushes 99 therein for contacting commutator rings 100 on the scanning sleeve. Terminal members 101 are connected to the brushes to provide electrical contact with conducting wires (not shown) for supplying electrical power to the lamp and for transmitting a signal from the detector photocell to electrical circuitry within the instrument. Likewise, suitable conductor wires are connected with the case reference photocell to provide a means for transmitting a signal therefrom to such electrical circuitry within the instrument housing.

A shaft 102 also extends upwardly from the motor section 19 of the instrument for driving an encoder 21. The output shaft from the motor is rotated at 3,600 rpm, or 60 revolutions per second. The encoder is arranged to be run from the output shaft of the motor and to multiply such rotation of the output shaft as to provide 12,000 pulses per second from the encoder.

The gear reduction section 79 is placed between the output shaft of the motor and the scanning device in the instrument housing so that the scanner is operated at 20 rpm, or 1 revolution every 3 seconds. Therefore, when the scanning mechanism has made one revolution within the instrument housing, in 3 seconds, the encoder or pulse generator has produced 36,000 pulses. As will be described later, this relationship between the encoder pulses and the scanner rotation readily permits a determination of degrees of scanner rotation between signals from the first and second photocells to an accuracy of 0.o1°. It is also seen that synchronization between the scanning mechanism in the instrument and the pulses generated by the encoder prevents any variation in the power supply from effecting the readout. Any variation in the operation of the motor from its intended 3,600 rpm will provide a proportional relationship between the rotational speed of the scanner and the output pulses from the pulse generator. The motor driving the angle detecting units is driven synchronously with motor 78 and encoder pulses from encoder 103 are also provided to circuitry for reading the angle units.

Referring next to FIG. 4 of the Drawings, a schematic representation of an electrical system for utilizing the information derived from the angle and azimuth units is shown. The pendulum 1 and 2 angle detecting units 13, 14 respectively and the gyro instrument section are shown having output lines leading to respective flip flop circuits. For example, the first output 104 of the pendulum 1 unit represents the scanning signal derived from the case reference photocell. This case reference signal places a pendulum 1 flip flop circuit 106 in condition to conduct and thus provide an output signal 107 through a conductor to an associated AND gate circuit 108, which is labeled Gate 1. A second signal output 109 from the pendulum 1 scanning section represents a signal derived from the detector photocell 53. The circuit is arranged so that this detector signal causes the pendulum 1 flip flop 106 to cease operation which in turn stops the flip flop output signal 107 to Gate 1.

During operation of the flip flop by the scanning signals, pulses from the pulse generator or encoder 21 are fed at the rate of 12,000 pulses per second to the Gates 1, 2, and 3 of the pendulum 1, 2, and the gyro respectively. When the respective flip flops are operating, pulses from the pulse generator will be countered or passed by the gate to a data counter and storage unit 111. When the flip flop ceases to operate, the gate discontinues passage of the pulses from the pulse generator to the data counter. Therefore, the duration of the signals from the flip flops will determine the time that such pulses are passed through the gate circuits to the data counter.

Referring again to the pendulum 1 instrument, when the scanning lamp passes the case reference photocell, the pendulum 1 flip flop is activated, which in turn sends the output signal 107 to Gate 1. This output 107 opens Gate 1 to permit the passage of pulses generated by the pulse generator to the data counter and storage unit. Such a signal from the flip flop will continue until the lamp 48 on the scanner passes the slit 61 in the pendulum shield to generate a signal output 109 from the detector photocell 53. The output 109 will cause operation of flip flop 106 to cease and thereby close Gate 108. The gate will thus cease passing the pulses generated by the pulse generator to the data counter. For example, if the scanner lamp 48 takes 1 ½ seconds to move from the reference photocell to the detector photocell, the flip flop will be outputting a signal for 1 ½ seconds. The gate therefore will be open for 1 ½ seconds. During this time span, 18, 0–0 pulses from the pulse generator will be passed by the pendulum 1 gate to the data counter. Since the scanner rotates at a rate of 1 revolution every 3 seconds, the scanner will have moved in the 1 ½ seconds over an arc of 180.00°, thus the detector photocell is located 180° from the reference photocell. This indicates that the detector housing is in a vertical position, and that therefore the wellbore is in a vertically oriented position, since the slit 66 in the reference photocell, which is at the top of the housing is, in fact, 180° away from the slit 61 in the pendulum shield which is located at the bottom center of the pendulum.

Operation of the gyro unit in the instrument is similar to that described above with respect to the pendulum units. The reference photocell on the azimuth unit is photocell 88. The slit 95 which permits light from lamp 87 to impinge upon the photocell 88 is oriented with respect to the tool housing and one of the pendulum units which in turn is oriented with respect to Magnetic North at the earth's surface. While the gyro unit housing turns in the wellbore, the gyro and slit 95 remain oriented with respect to Magnetic North. Thus, when the scanner lamp 87 passes the slit 95, the associated flip flop begins to conduct until the scanner lamp passes slit 97 to operate photocell 94. The pulses passed by gate 3 during this time span are likewise indicative of azimuthal degrees of difference between Magnetic North and the reference photocell 94 on the gyro unit housing. Since the gyro unit is referenced to the pendulum units and Magnetic North, the readings from these units may be combined to give a true angular and azimuthal orientation of the tool housing. First the outputs of the angle units are summed vectorially to provide an angle of inclination of the housing. Then, if the gyro unit output indicates that the housing has rotated X° from North, the pendulums have moved the same amount, and the vector summation is likewise rotated X°. The resultant computation gives the angular disposition of the housing relative to Magnetic North or similar surface reference.

The pulses which are supplied to the data counter from the subsurface units are stored in the counter and storage unit in binary form. After the information is read out of the pendulum 1 gate into the counter and storage unit, a switch causes information from the pendulum 2 gate to pass into the data counter and storage unit in the same manner, and likewise with the gyro unit. This information in turn is fed into the data processing unit at the surface, where the information relative to the pendulum 1 and pendulum 2 positions is used to calculate the angular disposition of the pendulums by performing a vector summation of the values supplied by each of the units which are located 90° to one another in the instrument housing. The gyro information is then combined with such angular information to provide data which will be indicative of the orientation of the tool, and therefore the borehole. This information may then be printed out in any wellknown manner or recorded for future use.

The data counter and storage unit consists of three sixteen bit, count and store units. By using counting and storage units, or "clock gated flip flops" as they are called, information may be read out from the storage units, while new information is gathered from the scanning systems into the counter units. Thus, the information in the storage units is continuously up dated, and is always available for immediate read-out. The pendulum and gyro units are continuously scanned at a one second scan rate, and the information stored in individual storage racks. These storage racks are scanned electronically by using a 16 bit ring counter driven by an oscillator or line frequency. A second three bit ring counter is driven from the 16 bit ring, and is used as a gateing programmer to select the storage register to be read out. The 48 bits of information from the three storage registers is read out in straight serial binary form, in one second intervals, and sent to the surface on a single conductor line. The power to the instrument is fed over the same conductor and may be either AC or DC voltage.

Alternatively, a multiple conductor cable may be used to pass signals from the Gates 1, 2, and 3 directly to the surface where they may be stored and processed in much the same manner as described above. Although described with respect to surface recording, it is readily seen that the apparatus described herein would be compatible for use with downhole recording equipment.

Therefore, while particular embodiments of the present invention have been shown and described, it is apparent that changes and modifications may be made without departing from this invention in its broader aspects, and the aim in the above description is to cover all such changes and modifications as fall within the true spirit and scope of this invention.

What is claimed is:

1. In a position sensing and indicating apparatus for use in a borehole: a housing arranged to be suspended in a borehole on a cable; a first angle detecting unit; a second angle detecting unit; counter means, means for supplying pulses to said counter, means for generating signals indicative of the angular disposition of said first and second units; means responsive to such generated signals for operating said counter; means for storing countered pulses corresponding to such generated signals; and surface means for providing an indication of such angular disposition in response to such stored counted pulses.

2. The apparatus of claim 1 wherein said first and second angle detecting units are mounted in said housing in planes 90° to one another.

3. The apparatus of claim 1 wherein said signal generating means includes means for scanning said angle detecting units and means for generating a first reference signal indicative of a reference mark on the housing and a second signal corresponding to the angular disposition of the angle detecting units relative to said reference mark, said first reference signal and said second signal being used to operate said counter.

4. In a position sensing instrument: a housing; angle detecting means in said housing for measuring a parameter of the angular disposition of the housing; azimuth position sensing means in said housing for measuring a parameter of the azimuthal disposition of the housing; means for generating signals indicative of such angular and azimuthal parameters; pulse generating means; pulse counting means; means responsive to said signal generating means for operating said pulse counting means; and surface means for providing an indication of such counted pulses.

5. The apparatus of claim 4 wherein said angle detecting means includes means in said housing for indicating a reference position; and means in said housing for indicating the position of a member independent of the position of said housing.

6. The apparatus of claim 5 wherein said signal generating means includes means initiating a first signal indicative of the reference position on said housing for operating said pulse counting means; and means initiating a second signal indicative of the relative position of said member to said reference position on said housing for stopping the operation of said counting means.

7. A method for determining the disposition of a borehole within the earth relative to the earth's surface, comprising the steps of: lowering a housing into the wellbore; detecting and measuring a parameter of the angular disposition of a first plane of said housing; detecting and measuring a parameter of the angular disposition of a second plane of said housing 90° to said first plane; detecting and measuring a parameter of the azimuthal disposition of said housing; generating electrical signals within said housing which are representative of the measured parameters; supplying timed pulses to a counter; operating the counter in response to such generated electrical signals; transmitting data corresponding to such counted pulses to the earth's surface; and calculating from the transmitted data, the position of such housing in the borehole relative to the earth's surface.

8. The method of claim 7 wherein said calculation involves making a vector summation of the angular parameters measured in planes 90° to one another, and orienting such vector summation with respect to the measured azimuthal parameters.

* * * * *